United States Patent
Schaeffer

(12) 
(10) Patent No.: US 6,517,898 B1
(45) Date of Patent: Feb. 11, 2003

(54) METHOD OF COATING

(75) Inventor: Gene Schaeffer, Hebron, CT (US)

(73) Assignee: Certek Ltd., East Hartford, CT (US)

( * ) Notice: Subject to any disclaimer, the term of this patent is extended or adjusted under 35 U.S.C. 154(b) by 28 days.

(21) Appl. No.: 09/779,058

(22) Filed: Jun. 30, 2000

Related U.S. Application Data

(63) Continuation of application No. 08/877,668, filed on Jun. 18, 1997, now Pat. No. 6,103,362.

(51) Int. Cl.[7] .................................................. B05D 1/38
(52) U.S. Cl. ...................... 427/202; 427/133; 427/181; 427/203; 427/205
(58) Field of Search ................................ 427/133, 135, 427/181, 201, 202, 203, 205; 65/60.2, 60.4, 60.5–60.53, 60.6, 60.7

(56) References Cited

U.S. PATENT DOCUMENTS

| | | | |
|---|---|---|---|
| 4,564,555 A | * | 1/1986 | Horhberger |
| 4,724,172 A | * | 2/1988 | Mosser et al. |
| 5,011,744 A | | 4/1991 | Saito et al. |
| 5,387,473 A | | 2/1995 | Yoshimi et al. |
| 5,472,783 A | * | 12/1995 | Mosser et al. |

FOREIGN PATENT DOCUMENTS

| JP | 08-296063 | 11/1996 |
|---|---|---|

OTHER PUBLICATIONS

Hawley's Condensed Chemical Dictionary, 13th Edition, pp. 761–762, 1997.*

* cited by examiner

Primary Examiner—Fred J. Parker
(74) Attorney, Agent, or Firm—Robert S. Smith

(57) ABSTRACT

The article in accordance with the invention is a corrosion and erosion resistant article having good release characteristics which includes a metal body having a first surface thereon and a base coat adhering to the first surface. The base coat comprises at least one layer of inorganic particulate material bonded to the first surface. A second coat adheres to the base coat. The second coat comprising a cured coating of solid particulate lubricant in a phosphate/chromate metal ion solution. The invention also includes a corrosion and erosion resistant coating having good release characteristics which includes a base coat, the base coat comprising at least one layer of inorganic particulate material bonded to the first surface; and a second coat adhering to the base coat. The second coat comprises a cured coating of solid particulate lubricant in a phosphate/chromate metal ion solution. The invention also include the method of applying a corrosion and erosion resistant coating having good release characteristics which indicate providing a metal body having a first surface thereon and applying a base coat to the first surface where the base coat comprises at least one layer of inorganic particulate material bonded to the first surface. The next step comprises partially curing the base coat, and applying a second coat that adheres to the base coat, the second coat comprises a cured coating of solid particulate lubricant in a phosphate/chromate metal ion solution. In some cases a third coat is applied.

20 Claims, 1 Drawing Sheet

METHOD OF COATING

This application is a continuation of U.S. patent application Ser. No. 08/877,668 filed Jun. 18, 1997 U.S. Pat. No. 6,103,362.

BACKGROUND OF THE INVENTION

The invention relates generally to erosion, corrosion, and abrasion resistant coatings, methods of coating, and coated articles. While the invention has particular application to coatings for use in glassware manufacturing processes it will be understood that it also has application to parts or substrates coated with such coatings and a process for making such coatings.

The prior art includes U.S. Pat. No. 4,564,555 that discloses a coating for imparting corrosion, temperature and abrasion resistant properties to a part which has bonded thereto at least one layer of metal particles. The layer is bonded in a substantially water-insoluble manner to which is adhered a flame sprayed metal or metalloid oxide layer. The second layer that is always applied with a flame spray process.

It is known to employ an electrolytic process to form a hard, corrosion resistant, glassy oxide film on metals as evidenced by the disclosures in U.S. Pat. Nos. 3,832,293 and 3,834,999 (both to Hradcovsky et al); 5,082,626 (Hradcovsky) and 4,184,926 (Kozak). These processes are commercially feasible for use in producing a film directly on metals which instantly possess electrolytic rectified properties, such as aluminum, magnesium, titanium and other light metals but such coatings have high permeability to gases and liquids.

U.S. Pat. No. 3,248,251 ('251 Allen) issued to Charlotte Allen relates to coating compositions consisting essentially of a slurry of solid inorganic particulate material (especially aluminum) in an aqueous acidic solution containing substantial amounts of dissolved metal chromate, dichromate or molybdate, and phosphate. After application of a coating to the substrate, it is heated to a temperature upwards of about 500° F. until the coating is water insoluble.

U.S. Pat. No. 3,869,293, of Robert J. Brambaugh provides a coating composition similar to the composition of the '251 Allen patent which utilizes as the solid particulate material an alloy comprising aluminum and magnesium so as to further improve the corrosion resistance of the coating.

Electrochemical methods for coating steel surfaces in an extremely short time in a dichromate solution containing phosphoric acid or in a chromic acid solution containing boric acid, borate or phosphoric acid are known. However, such procedures do not produce thick oxide coatings which are capable of withstanding abrasion, erosion and corrosion. U.S. Pat. No. 3,400,058 of Edward C. Ross et al notes the problem of forming a successful coating on iron and steel by electrochemical coating.

In U.S. Pat. No. 2,855,350 to Robert Ernst there is disclosed a procedure for producing an oxide coating on aluminum and aluminum alloys by electrolytic oxidation. The patent notes that the presence of copper and iron ions materially affects some electrolytic baths because the appearance of the ions requires an increase in current density which results in corrosion, that is, burning of the part being oxidized.

In accordance with the conventional technique employed in molding glass parts such as bottles, jars, and the like, the mold surface is frequently treated with a release material by a process known as swabbing. In accordance with swabbing technique or process, a swabbing composition, comprising a mineral oil carrier and a lubricant such as sulphur and/or graphite, is brushed into the glass forming equipment at intervals of between five and forty-five minutes. The swabbing composition is brushed into the mold to allow the molded glass part to be released from the mold without any marks on it and also it preserve the mold against deterioration during the molding process.

Numerous disadvantages have been encountered in using such swabbing techniques. In the conventional swabbing method, the mold must be polished before the swabbing compound is applied. Such a polishing operation inherently involves the removal of metal from the mold, the useful life of the mold is necessarily reduced as the metal is gradually worn away.

The swabbing procedure results in the production of significant amounts of smoke due to the heat at which the glass molds are operated. As a result, conventional oil swabbing techniques pose significant compliance problems under air pollution control regulations In addition, a swabbing technique exposes the worker performing the technique to the risk of personal injury. The glass making machinery opens for seconds at a time in the course of the operating cycle. If the operator does not complete the swabbing with those few second he will be maimed by the machinery. The worker is also exposed to health hazards because of the clouds of the oily smoke produced in the ambient.

Most of the prior art coatings have utilized one of more coatings of the same homogeneous mixture. Thus, coatings that include a lubricant, such as graphite in the mixture, have the graphite substantially uniformly distributed throughout the mixture. The distribution of the typical lubricant, such as graphite, throughout the entire mixture seriously compromises the strength, erosion resistance and durability of many prior art coatings.

The patents described above disclose various coatings that have been proposed including some that are particular application to a glassware manufacturing process. These coatings have not been wholly satisfactory and the almost universal approach to the problem of release of the glassware in the glassware manufacturing industry is the swabbing technique.

Accordingly, it is a primary object of the present invention to provide a new method for treating glass manufacturing molds.

A related object is to provide configuration for use in accordance with such process.

A further object is to provide a method for treating molds used in manufacturing glass parts which avoids the disadvantages of the prior art swabbing techniques.

The general object of the present invention is to provide a coating to eliminate swabbing of blanks, molds, neck rings, bottom plates, plungers, and other parts utilized in the glassware formation process.

Another object of the invention is to increase the production from any given production machinery by (1) permitting faster operation (more bottles per minute) and (2) reducing non-productive down time.

It is a further object of the present invention to provide a coating that when applied to molds and blanks provides a more even temperature distribution and thus eliminates hot spots within the blank that result in defects in the glassware.

It is another object of the invention to provide a coating that is applied to blanks which will eliminate the need to polish the substrate to facilitate release in the manner required in the prior art swabbing technique.

It is a further object of this invention to provide a coating that will comply with air pollution control standards by eliminating the use of oily swabbing materials that produce significant amounts of scrap when applied to hot glass molds.

Another object of the present invention is to provide an erosion resistant coating that will lessen the wear of the blanks and thus extend the useable life of the blank.

Another object of the invention is to improve the quality of the glassware produced from a given blank by limiting erosion that causes substrate wear and thus results in unsatisfactory glass distribution which results in variations in wall thickness of the glassware.

A still further object of this invention is to provide a durable lubricating coating which will facilitate the quick release of glassware during the forming processes.

Still another object of the invention is to provide a coating that will allow the article on which the coating is applied to be repaired by welding procedures without the need to remove the coating or the need to reapply the coating after the welding procedure is complete.

Still another object of the invention is to provide a coating and a method for applying the coating to an article in a manner that allows the user to control the thickness of the coating on respective parts of the article so that, for example, the distribution of the glass in a glassware manufacturing process will be controlled better.

Yet another object of the invention is to eliminate the personal injuries risks associated with the prior art swabbing techniques.

A further object of the invention is to provide a coating having discrete layers in which the lubritic materials are disposed in a top coat and substantially none of the lubritic materials are disposed in the base coat so that the overall coating has a higher durability, strength, and erosion resistance than would be the case if the lubric material were uniformly distributed throughout the entire coating.

An additional object of the invention is to provide a coating that can be polished to meet the finish specifications of particularly exacting applications.

SUMMARY OF THE INVENTION

It will now be seen that these and other objects of the invention may be attained in an article, a coating and a method of applying the coating. The article in accordance with the invention is a corrosion and erosion resistant article having good release characteristics which includes a metal body having a first surface thereon and a base coat adhering to the first surface. The base coat comprises at least one layer of inorganic particulate material bonded to the first surface. A second coat adheres to the base coat. That second coat comprising a cured coating of solid particulate lubricant in a phosphate/chromate metal ion solution.

The second coat may further includes a non-metallic particulate material. The metal of the metal body may be selected from the group consisting of iron, nickel, chromium, cobalt, aluminum and their alloys and may be steel. The solid particulate lubricant may include one or more materials selected from the group consisting of aluminum powder particulates, graphite, molybdenum sulfide, molybdenum disulphide, tungsten disulphide, iron oxide, boron nitride, magnesium oxide, chromium oxide, polyphenylene sulfide (PPS), perfluoralkoxy (PFA) and a fluoropolymer.

In some forms of the invention the phosphate/chromate metal ion solution may include $CrO_3$ and $H_3PO_4$ and the solid particulate lubricant material may include magnesium oxide, aluminum powder, and graphite. In other forms of the invention the solid particulate lubricant material may further include molybdenum disulphide. The article may include a fluoropolymer in said solid particulate lubricant material. The article may also include a third coating that is disposed on top of the second coating and includes polyphenylene sulfide (PPS) or perflouralkoxy (PFA).

The invention also includes a corrosion and erosion resistant coating having good release characteristics which includes a base coat, the base coat comprising at least one layer of inorganic particulate material bonded to the first surface; and a second coat adhering to the base coat. The second coat comprises a cured coating of solid particulate lubricant in a phosphate/chromate metal ion solution. The second coat may further includes a non-metallic particulate material and the metal of the metal body may be selected from the group consisting of iron, nickel, chromium, cobalt, aluminum and their alloys. The solid particulate lubricant may include one or more materials selected from the group consisting of aluminum power particulates, graphite, molybdenum sulfide, molybdenum disulphide, tungsten disulphide, iron oxide, boron nitride, magnesium oxide and chromium oxide and the phosphate/chromate metal ion solution may include $CrO_3$ and $H_3PO_4$.

In some forms of the invention the invention the solid particulate lubricant material includes magnesium oxide, aluminum powder, graphite and molybdenum disulphide. In addition the solid particulate lubricant material may further includes a fluoropolymer. The coating may further include a third coat that is disposed on top of the second coat and including polyphenylene sulfide (PPS) or perflouralkoxy (PFA).

The invention also include the method of applying a corrosion and erosion resistant coating having good release characteristics which includes providing a metal body having a first surface thereon and applying a base coat to the first surface where the base coat comprises at least one layer of inorganic particulate material bonded to the first surface. The next step comprises partially curing the base coat, and applying a second coat that adheres to the base coat, the second coat comprises a cured coating of solid particulate lubricant in a phosphate/chromate metal ion solution.

In some forms of the method the step of applying the second coat further includes applying a non-metallic particulate material. The providing step may include providing a metal body having a composition that is selected from the group consisting of iron, nickel, chromium, cobalt, aluminum and their alloys. The providing step may include providing a metal body having a composition that is steel. The step of applying a second coat may include applying a solid particulate lubricant that includes one or more materials selected from the group consisting of aluminum powder particulates, graphites, molybdenum sulfide,, molybdenum disulphide, tungsten disulphide, iron oxide, boron nitride, magensium oxide and chromium oxide.

In some forms of the invention the step of applying a second coat may include applying a phosphate/chromate metal ion solution that includes $CrO_3$ and $H_3PO_4$. and the step of applying a second coat includes applying a solid particulate lubricant material that includes magnesium oxide, aluminum powder, and graphite as well as molybdenum disulphide. The step of applying a second coat may further include applying a fluoropolymer.

The method may further include the additional step of applying a third coat that includes polyphenylene sulfide (PPS) or perflouralkoxy (PFA) followed by the additional step of curing the second coat at a temperature substantially above room temperature. Ordinarily, the additional step of applying a third coat occurs after curing the second coat at a temperature substantially above room temperature. Usually the method includes the step of curing the third coat at a temperature substantially above room temperature.

BRIEF DESCRIPTION OF THE DRAWING

The invention will be better understanding by reference to the drawing in which.

DESCRIPTION OF THE PREFERRED EMBODIMENTS

Figure 1:
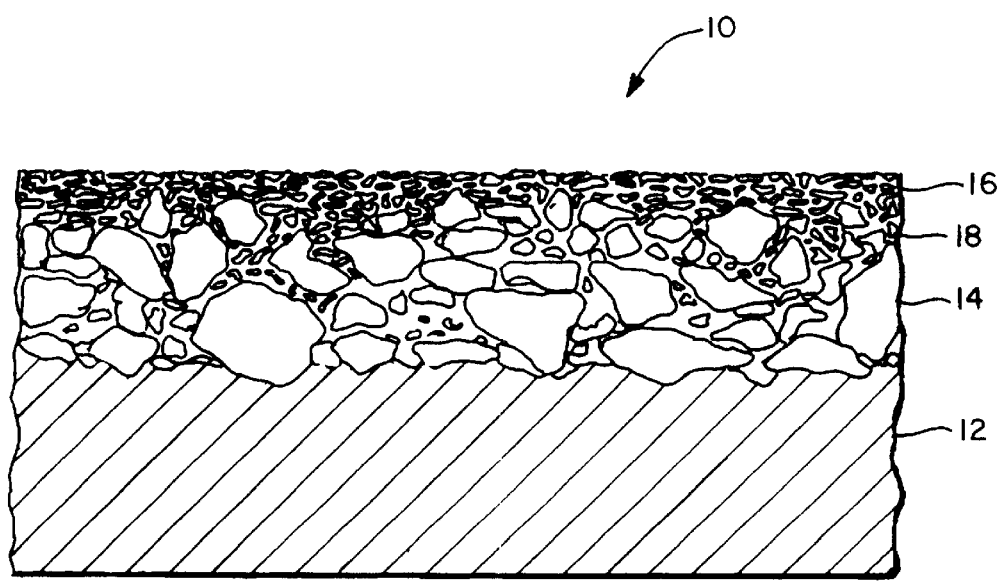
FIG. 1 is a partially schematic cross sectional view of an article on which two coatings in accordance with the present invention have been deposited.

The present invention includes a new technique for treating molds employed in manufacturing glass parts as well as other articles. In the glassware manufacturing field the coating permits a molded glass part to be quickly released and provides virtually complete protection for the mold surface while avoiding the disadvantage of the prior art. The part, coating and method of coating may employ their two or three discrete coatings. FIG. 1 illustrates a part having the two coating embodiment of the invention and FIG. 2 illustrates a part having the three cost embodiment of the invention.

FIG. 1 illustrates schematically the cross-section of a coated part 10 comprising a substrate 12. The substrate 12 typically is a metal body having a composition selected from the group consisting of iron, nickel, chromium, cobalt, aluminum and their alloys. The substrate 12 has deposited thereon a base coat 14 and a second coat 16 in accordance with a preferred form of the invention are deposited. A "layer" 18 is formed intermediate the base coat 14 and the second coat 16. It is the layer 18 into which the base coat 14 and the second coat 16 flow if the base coat 14 is not fully cured at the time of application of the second coat 16. Ordinarily the second cost will have a particle size distribution in which small particles are more remote from the substrate than the substrate 12. This achieves a higher density of lubritic materials at the interface with glassware that is being produced. Stated another way, in any given volume, a greater amount of material can be placed in the volume if the particles occupying that volume are small. If the particles are large the irregular faces thereof will not mesh easily and there will be part of the volume that cannot be filled. Ordinarily, the practice size distribution is achieved due to the effects of gravity. Typically, but not always, the base coat 14 is applied, allowed to partially cure at room temperature, the second coat 16 is applied and then both coatings are cured by heating. This coated article has the coating that is satisfactory for many applications.

Figure 2:
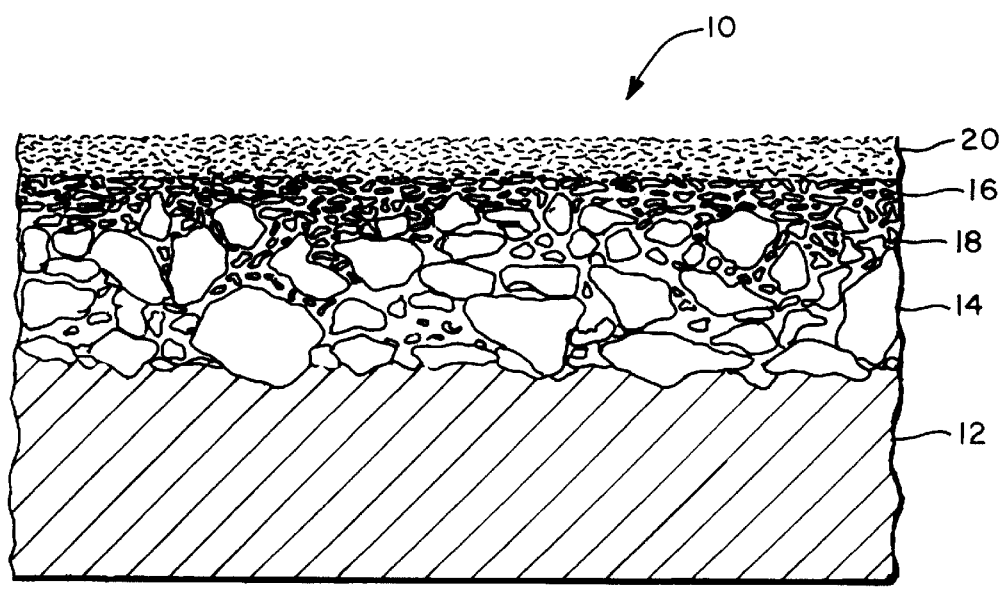
FIG. 2 is a partially schematic cross-section view of an article on which three coatings in accordance with the present invention have been deposited.

FIG. 2 is identical to FIG. 1 with the exception that a third layer 20 is the top layer. This coating and the method of application is desirable for some rigorous applications. The layer 20 comprises a polyphenylene sulfide (PPS) or perflouralkoxy (PFA) powder either alone or in a binder. Ordinarily the powder will have a thickness of between 0.00015 and 0.001 inch. Typically, the base coat 14 and the second coat are cured in the manner described above and then the third coat 20 is applied and cured. A more detailed description of the composition and manner of application of the respective layers follows.

First or Base Layer

In the preferred embodiment of the present invention the part to be coated is provided with a first layer formed with a chromate/phosphate composition that has air dried at ambient conditions. This drying step is not a complete cure such as would be accomplished by heating the coating in an elevated temperature as in the prior art methods. Thereafter, a second layer is deposited on top of the first layer by a spraying process. The second layer is a chromate/phosphate composition containing finely divided particles of graphite, molybdenum disulfide or other lubricating material. Other particulates may also be included to improve abrasion resistance. After the second layer is applied the first and second coatings are heated to render the entire coating water insoluble.

The first layer may be referred to herein as a base or bond layer. The base layer is provided in the preferred embodiment to provide a strong bond to the part and to prevent erosion of the part. The chromate/phosphate constituent(s) in the bond layer also adds as a thermal barrier so that the banks have an even heat distribution. In other words, the blanks will have smaller temperature gradients and less hot spots that comprise the quality of the glassware produced.

Although the composition of the coatings or layers and methods of this invention have as their prime utility the treatment of the surfaces of molds employed in molding glass parts, they can advantageously be employed to treat all metal surfaces of glass forming equipment auxiliary devices. These include, but are not limited to blanks, baffles, funnels, bottom plates, neck rings, delivery equipment, dead plates, stacker bars, wear transfer plates, metal conveyor belts, lehr plates as well as the finished molds themselves may be treated. Thus, as used herein, "mold surfaces" should be understood to refer to and encompass all such glass manufacturing and other equipment. Although the invention has particular application to glass manufacturing it will be readily apparent that there are many other applications for the present invention.

Glass mold surfaces treated in accordance with the present method do not need treatment as frequency as in the prior art method. For example, in a typical application the treatment need only be accomplished once every 88 hours (in contrast to a swabbing treatment every five to forty-five minutes in the prior art technique), thereby greatly increasing glass molding productivity. Although some applications may not have such a dramatic advantage there will be a substantial advantage associated with the present invention.

As noted, the composition in accordance with this invention is applied in aqueous solution form. An important advantage of this process resides in the fact that mineral and other oils and other smoke producing materials are not utilized. Thus, the noxious smoke given off by the prior art swabbing compounds is not produced in the process of this invention even when the molds are heated to their 600–1000° F. operating temperatures.

Since the breakdown and sacrificial deterioration of the protective layers provided by this invention is predictable, molds may be periodically coated on a schedule basis so that the glass manufacturing process will be more systematic than in the irregular nature of the application of swabbing techniques of the prior art. Moreover, use of the coatings and processes of this invention not only permits molded glass parts to be released from the molding equipment in the desired manner, but also provides the desired level of protection of the molding equipment. The mold surfaces need only be cleaned before the coating is applied. The polishing step of the prior art swabbing method, which actually wears away the mold surface, is not required. Thus, mold life is greatly enhanced.

Since the coatings of the invention are of uniform thickness, the molded glass parts can be produced to tight specifications more easily and fewer glass parts are rejected.

The coatings of this invention protect the mold surface. Intimate contact between the hot glass and bare metal does not occur. Thus, the galling and scaling produced by the contact of hot glass and bare metal which is routine in the prior art is avoided in the present invention. This results in a still further useful life for the molding equipment.

It should be pointed out that in the preparation of the composition for forming the chromate/phosphate layer, the +2 and +3 valence metals are preferably used to introduce metal ions into the chromate/phosphate solution. Magnesium has been found to be outstanding for this purpose, however, zinc ion also is desirable. To achieve optimum bonding of the second or oxide layer to the first layer and optimum erosion resistance of the entire coating, it is preferable that the metal ion concentration be at least about 1.5 moles per liter. Further, where the metal cation is all valence +2 or +3, and especially for magnesium as is preferred, it has been found desirable that the molar concentration of the metal ion not substantially exceed about one-half the total of the molar concentration of the phosphate and chromate (and/or molybdate) ions. At the same time, however, it is desirable that the metal ion concentration be at or approach this ratio of one mole per every two moles of phosphate plus chromate (and/or molybdate). For example, in the most preferred compositions where all the metal cation is valence +2, specifically magnesium, the molar concentration of metal to phosphate to chromate is about 2 to 3 to 1.

In accordance with the preferred methods of this invention, the coating is established, or formed, in a two or three stage operation. First, a chromate/phosphate binder and a quantity of metal particles (e.g. aluminum powder) are applied to the part to be coated, such as by spraying, dipping or other suitable technique. The liquid binder in which the metal particles are dispersed is an aqueous solution of a combination of inorganic compounds from the group consisting of phosphoric acid, chromic acid, molybdic acid and the metal salts of these acids. The combination of compounds in the solution will have at least 0.1 mole per liter of dissolved phosphate (preferably 0.5 mole per liter), at least 0.2 mole per liter from the group consisting of chromate and molybdate, and optionally, at least 0.5 mole per liter of dissolved metal. Preferably, the metal particles dispersed in the binder have a grain size of less than 325 mesh (referred to herein as −325 in accordance with the custom in the art), and in the most preferred embodiment of this invention are aluminum powder (spherical, 4–10 microns) present in the amount of about 10 to 2000 grams per liter of the solution. The chromate/phosphate layer may be of any size desired, however, it has been found that a layer size of about 1 to about 1.5 mils provides desirable results. The thicker the coating the greater the thermal insulation. Most preferably, the concentration of aluminum powder is from about 600 to 800 grams per liter of solution.

It is noteworthy that, in accordance with the invention, a greater latitude is provided in the type of phosphate compositions which can be used. For instance, with respect to the above-mentioned Allen patent (U.S. Pat. No. 3,248,251) it is not necessary that the phosphate binder be confined to the various concentration and other molar relationships disclosed by that patent. (For example, the base coat may be similar to that described in the Collins, Jr. et al U.S. Pat. No. 4,319,924) The present invention, therefore, allows for the use of a large number of and a great variety of acid binder solutions for molding the coating composition in accordance with the invention.

In accordance with the invention, the composition on the first layer or coating of the invention comprises the acid binder which comprises phosphate ions and ions of the group of chromate or molybdate ions and metal particles dispersed therein. Most preferably the metal is aluminum and its alloys. However, any combination of metals may be utilized depending upon the particular requirements.

Therefore, in accordance with the invention, there is provided the liquid acid solution (which contains the phosphate ions) and the particulate metallic material, which preferably is aluminum, for use in forming a first layer on a substrate.

A preferred manner of forming the first layer of the coatings of the invention is to admix the particulate metal material under vigorous mixing conditions into the chromate/phosphate and/or molybdate-containing binder.

The sequence of addition of the components of the phosphate solution is not critical either, as is disclosed in the prior art, such as the Allen U.S. Pat. No. 3,248,251.

After the chromate/phosphate coating has been applied to the part or substrate, it is dried or cured at ambient conditions before the second lubricant layer is applied.

Thereafter both the base and second coat are cured at a temperature sufficient to form a substantially water-insoluble material with the metal particles firmly bonded therein.

The application of the chromate/phosphate coating and ambient curing may be performed one or more times depending on the thickness of the layer desired. Ordinarily, only one layer will be necessary or desirable although some articles may require more than one application to form the base coat.

It will be understood that other particulate materials may be added to the binder for the second coat, prior to mixing, in amounts depending on the specific characteristics desired for the layer such as graphite, refractory metal oxides, refractory carbides, nitrides, silicides and borides, and metal carbides, nitrides, silicides, and borides.

The following are representative compositions of chromate/phosphate for layer coatings usable in the invention. The invention is not limited in any way by these examples, which are provided only by way of illustration.

EXAMPLE 1

A composition for use in preparing the first layer of the coating of the invention of the type disclosed by Allen (U.S. Pat. No. 3,248,251) is prepared by mixing the following components:

| | |
|---|---|
| $MgCr_4 7H_2O$ | 266 grams |
| $H_3PO_4$ | 98 grams |
| $Mg(H_3PO_4)_2 3H_2O$ | 272 grams |
| Aluminum powder (spherical, 5–10 mu) | 600 grams |
| $H_2O$ quantity sufficient to bring the total volume of composition to 1000 cc | |

This composition may be coated on ordinary steel stock (SAE 1010 steel) although any other suitable substrate may be used in place of the steel, i.e., nickel, chromium, copper, glass, ceramic, etc. The composition is ordinarily sprayed on the stock and then dried at approximately normal room temperature for between 5 and 30 minutes (although at very high humidity conditions it will be difficult to achieve any drying). Typically, sufficient drying will have occurred when the composition turns gray. The preferred form of the invention does not cure the composition at a high temperature for an extended period of time.

Variations of this example may replace the magnesium chromate with any one of the following chromate containing compounds:

| Chronic acid | $H_2CrO_4$ or $CrO3$ |
|---|---|
| Magnesium dichromate | $MgCr_2O_7$ |
| Zinc chromate | $ZnCrO_4$ |
| Zinc dichromate | $ZnCr_2O_7$ |
| Calcium dichromate | $CaCr_2O_7$ |
| Lithium dichromate | $Li_2Cr_2O_7$ |
| Magnesium dichromate plus sodium dichromate | $MgCr_2O_7$ and $Na_2Cr_2O_7$ |

EXAMPLE 2

Following the procedure of Example 1, the binder for the first layer of the coating of the invention is a mixture of the following:

| MgO | 7.25 grams |
|---|---|
| Chromic acid | 9.20 grams |
| Phosphoric acid (85%) | 22 ml |
| Water | 80 ml |

80 g of aluminum powder (325 mesh) is added to the binder with mixing under high shear so as to form the composition for the first coating.

The first coat is dried at approximately normal room temperature for between 5 and 30 minutes. Typically, sufficient drying will have occurred when the composition turns gray. The preferred form of the invention does not cure the composition at a high temperature for an extended period of time.

If desired, in place of the aluminum, at least one of the following metals in powder form may be used: Mg, Fe, Ti, Nb, Ca, Zr, Hf, La, Mn, Rn, V or their alloys.

EXAMPLE 3

Following the procedure of Example 1, a composition especially useful for forming the first layer of a coating of the invention on low carbon steel pairs or stainless steel parts is prepared as follows:

| $CrO_3$ | 92 grams |
|---|---|
| $H_3PO_4$ | 323 grams |
| MgO | 72 grams |
| Aluminum powder (spherical, 5–10 mu) | 800 grams |

$H_2O$ having a quantity sufficient to bring the total quantity of the composition to 1000 cc The ingredients are mixed, coated onto the part and dried at normal room temperature for about 5–30 minutes. Typically, sufficient drying will have occurred when the composition turns gray. The preferred form of the invention does not cure the composition at a high temperature for an extended period of time. If desired, other particulate materials may be added to the composition prior to mixing, i.e., graphite (5–10 microns), refractory metal oxides, refractory carbides, nitrides, silicides and borides.

If desired, the part may be repeatedly coated with the composition and cured so as to obtain a layer of desired thickness onto which the second coating is then placed as will be hereinafter described.

EXAMPLE 4

Another composition was prepared following the procedure of Example 1 with the following ingredients:

| Chromic acid | 35.97 grams |
|---|---|
| Magnesium oxide | 6.26 grams |
| Phosphoric acid (85%) | 64 ml |
| Water to 1000 ml | |
| Aluminum powder (−325 mesh, 4–6 mu average particle size) | 600 grams |

EXAMPLE 5

A first layer for a stainless substrate steel is prepared utilizing a composition of the type disclosed by Wydra (U.S. Pat. No. 3,857,717). No cations are added, but phosphorous acid is used to react with some of the chromic acid producing trivalent chromium and phosphoric acid in situ.

| $H_2O$ (deionized) | 295 grams |
|---|---|
| $H_3PO_4$ (85%) | 87 grams |
| $H_3PO_3$ | 42 grams |
| $CrO_3$ | 62 grams |
| Aluminum powder (spherical, particle size 4–6 mu) | 400 grams |

The composition may be applied to the substrate by a spray gun according to the procedure of Wydra to obtain a layer thickness of 0.1 mm. The first coat is dried at approximately normal room temperature for between 5 and 30 minutes. Typically, sufficient drying will have occurred when the composition turns gray. The preferred form of the invention does not cure the composition at a high temperature for an extended period of time. The steel substrate which can be utilized is any one of the AISI standard alloy steel compositions, including the Mn steels, Ni steels, Ni—Cr steels, Mo steels, Cr—Mo steels, Ni—Mo steels. Cr steels and Cr—V steels.

EXAMPLE 6

A binder is prepared by mixing the following components:

| $MgCr_2O_7 6H_2O$ | 174 grams |
|---|---|
| $Na_2Cr_2O_7 2H_3O$ | 75 grams |
| MgO | 40 grams |

| | |
|---|---|
| H$_3$PO$_4$ | 196 grams |
| H$_2$O in a quantity to bring the total quantity of the composition to 1000 cc Silica (-5 mesh size) | 800 grams |

The prepared composition may be coated on the articles of this invention of spraying, drying at 80 degrees Fahrenheit and then curing at normal room temperature as described in the previous examples.

Second Coat

After the base coat has partially cured or dried at ambient conditions a second coating is applied consisting of a chromate/phosphate solution in which metal particles (preferably aluminum) are dispersed with a solid lubricant such as graphite. For some applications a further lubricant coating may be added to the coating. The further lubricant may be a fluoropolymer, polyphenylene sulfide (PPS), or perflouralkoxy (PFA). Ordinarily, fluoropolymers will not be used in applications involving elevated temperatures such as those encountered in a glass making process although they will be satisfactory for many other applications.

After the chromate/phosphate layer has been dried, the application of the lubritic second coat is applied. The water soluble base coat is again made wet when the second coat is deposited on the base coat. (The wetting is somewhat analogous to the effect on a primer coat of paint that has a second layer of paint added on top of the primer before the primer completely dries). The rewetting of the base coat in combination with the solid lubricants of the second coat results in some flow between the respective coats and forms an intermediate layer between the base coat and the second coat. This interface or intermediate layer couples the base coat, that is tenaciously bonded to the article, to the second coat. The second coats is preferably formed with solid lubricant particulates which, at least in some cases, have a particulate size that is large on the face of the second coat that is nearest the intermediate layer and that is smaller on the face of the second coat that is farthest from the intermediate layer.

The multi-coat coating in accordance with the present invention is satisfactory foresome applications if the base coat is fully cured. It is preferred, however, that the base coat not be fully cured before application of the second coat because this results in a more clearly defined intermediate layer into which both costs flow, mix and lock together. In other words there is much greater bond strength between the base coat and the second coat if the base coat is not fully cured at the time of application of the second coat. Ordinarily, the second coat is a phosphate/chromate metal ion solution with metallic and non-metallic materials in a ratio that will depend on the physical characteristics required for a particular application such as bond strength, thermal conductivity, abrasion resistance, and lubritic release properties. Typically, the solid particulate lubricant includes one or more materials selected from the group consisting of aluminum powder particulates, graphites, molybdenum sulfide, molybdenum disulphide, tungsten disulphide, iron oxide, boron nitride, magnesium oxide, chromium oxide, polyphenylene sulfide (PPS), perflouralkoxy (PFA) and a fluoropolymer.

The following are examples of second coats that have been found to the satisfactory.

EXAMPLE 1

The composition is prepared by mixing the following components and then coating the mixture on the base coat followed by curing at about 600 degrees Fahrenheit for 90 minutes.

| | |
|---|---|
| CrO$_3$ | 4.7 grams |
| H$_3$PO$_4$ | 18.9 grams |
| MgO | 3.9 grams |
| Aluminum powder | 19.8 grams |
| Graphite | 9.9 grams |
| Molybdenum Disulfide | 9.9 grams |
| H$_2$O | quantity to bring total quantity up to 70 cc. |

EXAMPLE 2

Another composition for the second coat was prepared that was identical to that of the preceding example except that the molybdenum disulfide was not included. After mixing of the ingredients and coating the ingredients on the base coat by spraying or other application technique the second coat was cured at 1000 degrees Fahrenheit for 90 minutes.

EXAMPLE 3

The composition described above in example 2 was mixed with a quantity of fluoropolymer powders and the mixture was sprayed on the base coat and cured at 750 degrees Fahrenheit for 10 minutes.

Third Coat

For many applications the two coatings or layers are all that is necessary to achieve the desired results. However, for some applications the process also includes a third step. The third step includes a further step of spraying a polyphenylene sulfide (PPS) or perflouralkoxy (PFA) powder on the outermost surface of the second layer. Ordinarily the powder will have a thickness of between 0.001 and 0.010 inch. For most applications, a thickness closer to 0.001 than to 0.010 will produce better results. The applications may be accomplished by spraying the powder alone or with a binder. Alternatively, the application may be achieved with an electrostatic process with the powder in a binder. Usually, this third coating will not be used in those coatings that also have a fluoropolymer in them.

It will be understood that the second coat will preferably be fully cured before application after application of that coat. This is the preferred approach if (1) a third coat is not to be applied or (2) a third coat is to be applied. After application of the third coat, the part is preferably cured at 750 degree Fahrenheit for 5 minutes.

Testing the coating, produced by the process, and the article on which the coating is deposited on glassware manufacturing apparatus has confirmed that all of the noted objects of the invention are achieved. Those skilled in the art will recognize that the release properties of the coating will have many other applications.

The invention has been described with reference to the preferred embodiments. Persons skilled in the art of such inventions may upon exposure to the teachings herein, conceive other variations. Such variations are deemed to be encompassed by the disclosure, the invention being delimited only by the following claims:

Having thus described my invention I claim:

1. A method of applying a corrosion and erosion resistant coating having good release characteristics which includes
providing a metal body having a first surface thereon;
applying a base coat to said first surface, said base coat comprising at least one layer of inorganic particulate material bonded to said first surface;

partially curing said base coat at a temperature and duration not sufficient to form a substantially water insoluble coating:

applying a second coat that adheres to said base coat, said second coat comprising a coating of solid particulate lubricant in a phosphate/chromate metal ion solution; and curing the base coat and the second coat at a temperature and duration sufficient to be substantially water insoluble and to adhere said second coat to said base coat to form an interface layer therebetween.

2. The method as described in claim 1 wherein:

said step of applying said second coat further includes applying a non-metallic particulate material.

3. The method as described in claim 2 wherein:

said providing step includes providing a metal body having a composition that is selected from the group consisting of iron, nickel, chromium, cobalt, aluminum and their alloys.

4. The method as described in claim 3 wherein:

said providing step includes providing a metal body having a composition that is steel.

5. The method as described in claim 3 wherein:

said solid particulate lubricant includes one or more materials selected from the group consisting of aluminum powder particulates, graphites, molybdenum sulphide, molybdenum disulphide, tungsten disulphide, iron oxide, boron nitride, magnesium oxide, chromium oxide, polyphenylene sulfide (PPS), perflouralkoxy (PFA) and a fluoropolymer.

6. The method as described in claim 5 wherein:

said step of applying a second coat includes applying a phosphate/chromate metal ion solution that comprises $CrO_3$ and $H_3PO_4$.

7. The method as described in claim 3 wherein:

said solid particulate lubricant material includes at least one of the substances selected from the group consisting of magnesium oxide, aluminum powder, and graphite.

8. The method as described in claim 3 wherein:

said solid particulate lubricant material further includes molybdenum disulphide.

9. The method as described in claim 8 wherein:

said step of applying a second coat further includes applying a fluoropolymer.

10. The method as described in claim 8 further including:

an additional step of applying a third coat on top of the second coat that includes a material selected from the group consisting of polyphenylene sulfide (PPS) and perflouralkoxy (PFA).

11. The method as described in claim 10 further including:

the additional step of curing the second coat at a temperature above room temperature.

12. The method as described in claim 10 wherein:

the additional step of applying a third coat occurs after curing the second coat at a temperature above room temperature.

13. The method as described in claim 10 further including:

the additional step of curing said third coat at a temperature above room temperature.

14. The method as described in claim 3 wherein:

said step of applying a second coat includes applying a solid particulate lubricant material that includes aluminum powder and graphite.

15. A method of applying a corrosion and erosion resistant coating having good release characteristics which includes:

providing a metal body having a first surface thereon;

applying a base coat to said first surface, said base coat comprising at least one layer of inorganic particulate material bonded to said first surface;

drying said base coat at substantially room temperature;

applying a second coat that adheres to said base coat, said second coat comprising a coating of solid particulate lubricant in a phosphate/chromate metal ion solution; and curing the base coat and the second coat at a temperature and duration sufficient to be sufficiently water insoluble.

16. The method as described in claim 15 wherein:

said step of applying said second coat further includes applying a non-metallic particulate material.

17. The method as described in claim 16 wherein:

said providing step includes providing a metal body having a composition that is selected from the group consisting of iron, nickel, chromium, cobalt, aluminum, and their alloys.

18. The method as described in claim 17 wherein:

said step of applying a second coat includes applying a solid particulate lubricant that includes one or more materials selected from the group consisting of aluminum powder particulates, graphites, molybdenum sulphide, molybdenum disulphide, tungsten disulphide, iron oxide, boron nitride, magnesium oxide, chromium oxide, polyphenylene sulfide (PPS), perflouralkoxy (PFA) and a fluoropolymer.

19. The method as described in claim 18 wherein:

said step of applying a second coat includes applying a phosphate/chromate metal ion solution that comprises $CrO_3$ and $H_3PO_4$.

20. The method as described in claim 17 wherein:

said step of applying a second coat includes applying a solid particulate lubricant material that includes a least one of the substances selected from the group consisting of magnesium oxide, aluminum powder, and graphite.

* * * * *